UNITED STATES PATENT OFFICE.

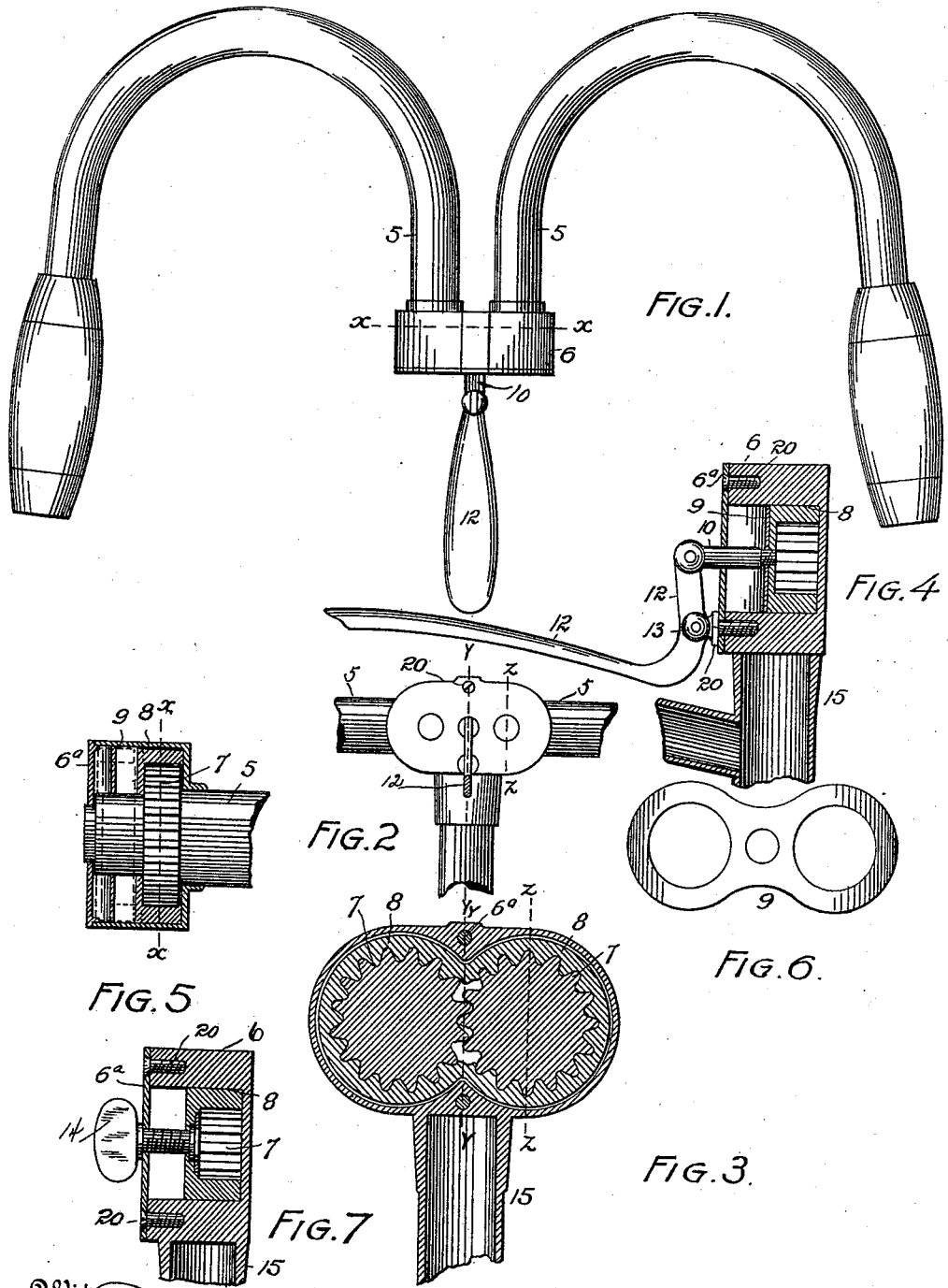

AMOS V. GREEN, OF DENVER, COLORADO, ASSIGNOR OF ONE-HALF TO JOHN G. MORGAN AND LYMAN B. H. BROWN, OF SAME PLACE.

HANDLE-BAR FOR BICYCLES.

SPECIFICATION forming part of Letters Patent No. 581,254, dated April 20, 1897.

Application filed September 3, 1896. Serial No. 604,766. (No model.)

*To all whom it may concern:*

Be it known that I, AMOS V. GREEN, a citizen of the United States of America, residing at Denver, in the county of Arapahoe and State of Colorado, have invented certain new and useful Improvements in Adjustable Handle-Bars for Bicycles; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to improvements in adjustable handle-bars for bicycles and similar machines; and it consists of the features hereinafter described and claimed, all of which will be fully understood by reference to the accompanying drawings, in which is illustrated an embodiment thereof.

In the drawings, Figure 1 is a top or plan view of my improved handle-bar. Fig. 2 is a fragmentary rear view of the same. Fig. 3 is a section taken on the line $x\,x$, Figs. 1 and 5. Fig. 4 is a section taken on the line $y\,y$, Figs. 2 and 3. Fig. 5 is a section taken on the line $z\,z$, Figs. 2 and 3. Fig. 6 is a detail view of the spring engaging the movable rack. Fig. 7 illustrates a modified form of construction.

Similar reference-characters indicating corresponding parts in these views, let the numeral 5 designate each of two distinct handle-bars whose extremities, remote from the handles, are journaled in a casing 6. Located within the casing and made fast to each handle-bar extremity is a small gear or pinion 7. These pinions mesh with each other and are adapted to engage a movable cogged rack 8, also located within the casing. This rack has the shape of the figure 8, with a break in the center to allow the pinions 7 to mesh. It is interiorly cogged to engage the exterior cogs of the meshing pinions, and therefore forms a housing for the pinions. This housing-rack fits snugly within the casing 6, which has the general shape of the rack and maintains the latter in operative position with reference to the pinions 7. This rack is normally held in engagement with the pinions by a spring 9. When in this position, the rack locks the handle-bars against movement. This spring bears against the casing 6 on one side and forces the rack into mesh with the pinions.

When it is desired to adjust or change the position of the handle-bars, the rack is moved within the casing sufficiently to release the pinions, after which the handle-bars may be turned at will either up or down and to any extent desired. When the two bars are properly adjusted, the rack is released and returns to engagement with the pinions and locks the bars securely in the changed position. The rack may be actuated to release the pinions by the employment of any suitable mechanism. As shown in the drawings, an arm 10 is rigidly secured to the rack at a central point and protrudes from the casing 6 through an aperture therein sufficiently to permit its connection with one arm of a lever 7, which is fulcrumed on the casing, as shown at 13. By pressing the rearwardly-projecting arm of this lever it is evident the rack will be withdrawn from engagement with the pinions, when it will occupy the position shown by dotted lines in Fig. 5. When the rack is in this position, the handle-bars may be raised or lowered at will to any extent desired. Hence they may be folded closely together in either direction, that is, so that they shall project either up or down. Of course any other suitable means for adjusting or moving the housing-rack back and forth in the casing may be employed.

The casing 6 is secured to the upper extremity of a depending stem 15, which is clamped to the post of the front fork (not shown) in the ordinary or any suitable manner. One side $6^a$ of the casing is detachable and held in place by suitable fastening devices, as screws 20.

Another means for adjusting the rack is shown in Fig. 7. In this case a thumb-screw 14, engaging a threaded aperture in the casing, is employed. The wing extremity of this screw is located outside the casing, while its opposite or inner extremity is swiveled in the rack at a central point. It is evident that by turning this screw the rack 8 may be moved in either direction at will, according as it is necessary to release the handle-bars or lock them against movement.

Having thus described my invention, what I claim is—

1. The combination with a suitable casing attached to a depending stem adapted to be connected with the post of a bicycle-fork, of the two distinct handle-bars journaled in said casing, the said bars being provided with meshing pinions, a movable locking-rack located within the casing and forming a housing for the pinions, said rack being interiorly cogged to engage the cogs on the peripheries of the meshing pinions, and suitable means for actuating said rack.

2. The combination with a suitable casing, of two distinct handle-bars journaled therein, and provided with meshing pinions, a spring-held movable locking-rack located in said casing and forming a housing for the pinions, said rack being interiorly cogged to fit the peripheries of the pinions which are normally engaged by the rack, and suitable means for shifting the rack sufficiently to unlock the pinions.

3. The combination with a suitable casing, of two distinct handle-bars journaled in said casing and carrying meshing pinions, a movable spring-held locking-rack forming a housing for the pinions and interiorly cogged to fit their peripheries, which are normally engaged by the rack, and a lever fulcrumed on the casing and connected with the rack for shifting the latter.

4. The combination with a suitable casing, of two distinct handle-bars journaled in said casing and carrying meshing pinions, a movable rack located in said casing and shaped like the figure 8, said rack forming a housing for the pinions and being interiorly cogged, whereby it is adapted to fit the cogged peripheries of the two meshing pinions, and suitable means for actuating said rack.

In testimony whereof I affix my signature in presence of two witnesses.

AMOS V. GREEN.

Witnesses:
ALFRED J. O'BRIEN,
E. W. WAYBRIGHT.